Feb. 9, 1971    J. V. BAATRUP    3,561,893
HYDROSTATIC CONTROL EQUIPMENT, PARTICULARLY
FOR STEERING SYSTEMS
Filed Nov. 19, 1968    2 Sheets-Sheet 1

United States Patent Office 3,561,893
Patented Feb. 9, 1971

3,561,893
HYDROSTATIC CONTROL EQUIPMENT, PARTICULARLY FOR STEERING SYSTEMS
Johannes Vagn Battrup, Sonderborg, Denmark, assignor to Danfoss A/S, Nordborg, Denmark, a company of Denmark
Filed Nov. 19, 1968, Ser. No. 777,054
Claims priority, application Germany, Dec. 14, 1967, D 54,842
Int. Cl. B62d 5/08; F01c 1/10
U.S. Cl. 418—61                                          1 Claim

ABSTRACT OF THE DISCLOSURE

The invention relates to a hydrostatic control unit of the general type used for vehicle steering systems. A gerotor gear set is used for the metering unit and a pair of plate type valves are cooperable with the gerotor unit. A drive assembly is provided between the gerotor unit and the valves which functions as a drive between the gerotor and one of the valves and as a means for providing limited relative rotational movement between the valves for control purposes.

---

Figure 1:
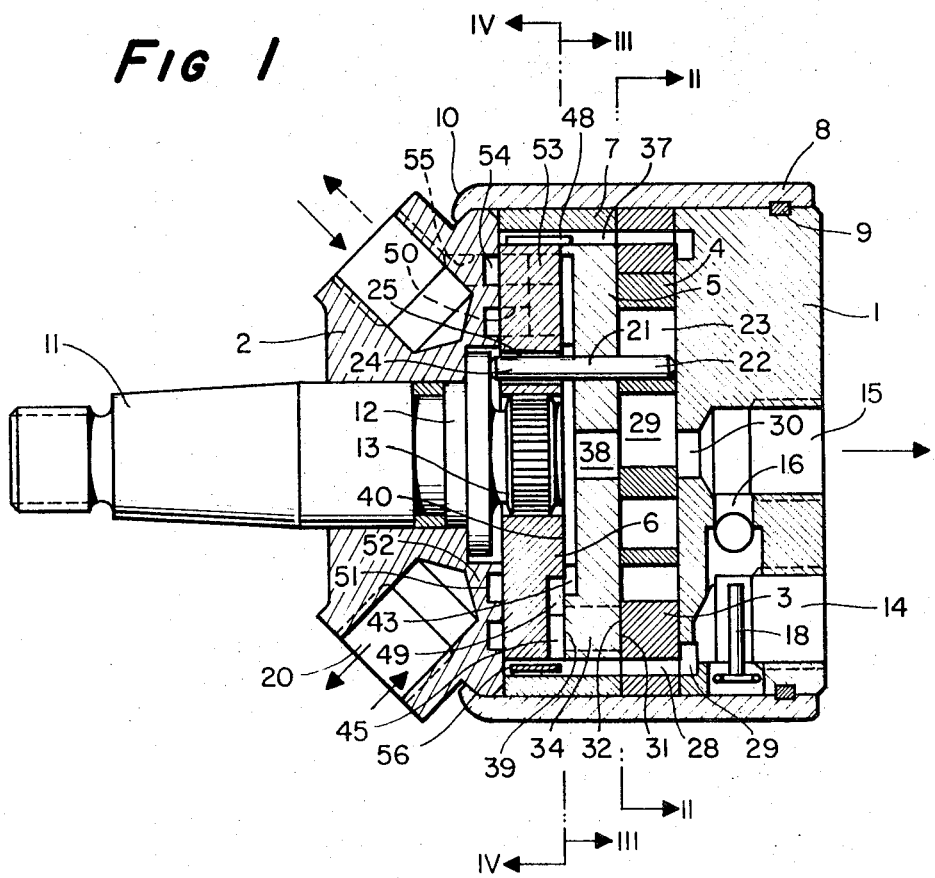

The invention relates to hydrostatic control equipment, particularly for steering systems, comprising: a metering pump consisting of an outer toothed ring and an inner toothed wheel having one tooth fewer, the centre-point of which moves along a circular path; a commutator valve, the first part of which revolves at the speed of the toothed ring and the second part of which at the speed of the toothed wheel; and a change-over valve, which has a neutral position and two operative positions on each side thereof, each associated with one direction of rotation, the first part of said change-over valve being connected to a rotatable actuating shaft and its second part being solidly connected to the second part of the commutator valve so as to rotate therewith.

In U.S. patent specification 2,984,215, the contents of which have been referred to as regards the mode of operation of such hydrostatic control equipment, there is disclosed equipment wherein two concentric sleeves are provided in a housing, which sleeves contain openings, recesses and grooves. The change-over valve is formed by the mutually adjacent circumferential surfaces of the inner and outer sleeves, and the commutator valve by the mutually adjacent circumferential surfaces of the outer sleeve and of the housing. The coupling between the outer sleeve and the toothed wheel, enabling them to rotate together, consists of a pin disposed transversely of the axis and secured in the outer sleeve, which pin is engaged by a universal-joint shaft connected to the toothed wheel. The pin passes freely through the inner sleeve and permits relative movement, against the force of a spring, between the inner and the outer sleeves, when a force is applied to the actuating shaft connected to the inner sleeve, for the purpose of shifting the change-over valve from the neutral position to one of its two operative positions. In the case of this control equipment, the axial length cannot be below a certain minimum. Furthermore, the production of sleeve-like valve arrangements is expensive.

The object of the invention is to provide hydrostatic control equipment which can be of extremely short construction in the axial direction and which permits the valves to be produced in a simpler manner.

According to the invention, this object is achieved by a first disc, one end-face of which forms the second part of the commutator valve, carrying a number of pins projecting on both sides, by the ends of the pins engaging, on one side, in circular holes in the toothed wheel, the diameter of which holes corresponds to the circular path taken by the centre-point of the toothed wheel plus the pin-diameter, and by the ends of the pins engaging, on the other side, in arcuate holes in a second disc, the length of which holes defines the relative change-over movement, one end-face of said second disc forming the first part of the change-over valve.

With this construction, it suffices, in the extreme case, to arrange the disc-shaped metering pump and the first and second flat discs beside each other between two boundaries in the housing, in order to obtain a fully functional control equipment which is thus extremely short in the axial direction. The flat discs, including all the necessary openings, recesses, etc., can be produced very easily as compared with a sleeve, for example by sintering. The pins have a two-fold function: firstly, they replace the universal-joint shaft communicating with the circular holes in the toothed ring, and secondly, in conjunction with the arcuate holes in the second disc, they form a stop limiting the change-over movement.

It is particularly advantageous if that end-face of the first disc facing away from the commutator valve forms the second part of the change-over valve. Furthermore, the toothed ring and the toothed wheel can lie directly against the commutator valve end-face of the first disc and the gaps between the teeth of the toothed ring can form the first part of the commutator valve. These steps result in the above-described construction of very short axial length.

In a further form of the invention, it is of advantage for the first disc to contain twice the number of orifices as there are teeth on the toothed wheel, which orifices are disposed at the same distance apart on the commutator valve end-face, and at alternately greater and smaller distances apart on the change-over valve end-face, there being provided in the last-named end-face and in the middle of the greater orifice-separating distances, grooves which communicate with one of the two supply ports, and for the second disc to have first, second and third recesses on the change-over valve end-face, the first recesses, in the neutral position, each lying between the openings of two orifices in the first disc and communicating with the other of the two supply ports, and the second and third recesses on both sides of the grooves lying between these and the orifice openings and each communicating with one of the two ports of the equipment to be operated. In this way, there is obtained, with the minimum expense and trouble, a valve construction wherein a small change-over movement from the neutral position results in the desired flow through the equipment to be operated and through the metering pump.

It is also advantageous to arrange the supply ports in a housing cover positioned at that side of the metering pump facing away from the first disc, and to connect them with the grooves or the first recesses through a passage extending centrally through the toothed wheel and the first disc, on the one hand, and through an annular passage extending through the toothed ring and surrounding the first disc, on the other. In a construction of this kind, the space inside and outside the zones required for the metering pump and the valve operation is used to establish connection with readily accessible ports.

It is of advantage, too, if the ports of the equipment to be operated are fitted in a part of the housing comprising the bearing for the actuating shaft and are connected with each of two concentric annular cavities in the inner end-face thereof, and if the second recesses are connected, via orifices in the second disc, to one annular cavity and the third orifices are correspondingly connected to the second annular cavity. With such a construction, the ports of the equipment to be operated are positioned on that end-face of the housing disposed opposite the supply ports and are likewise readily accessible.

Near the change-over valve, it is also possible to establish a short-circuit path in the neutral position, if in the change-over valve end-face of the first disc and between radial grooves extending from the central passage to points between the second and third recesses, there is provided, in each case, a further short-circuiting groove extending radially from the central passage, which groove is shorter and, in the neutral position only, overlaps a radially inwardly projecting extension of the first recess.

Further, advantageous utilization of space is achieved by fitting a spring, which returns the change-over valve to the neutral position, in an annular cavity around the second disc. This annular cavity can, for example, be an extension of the previously mentioned annular passage.

Figure 2:
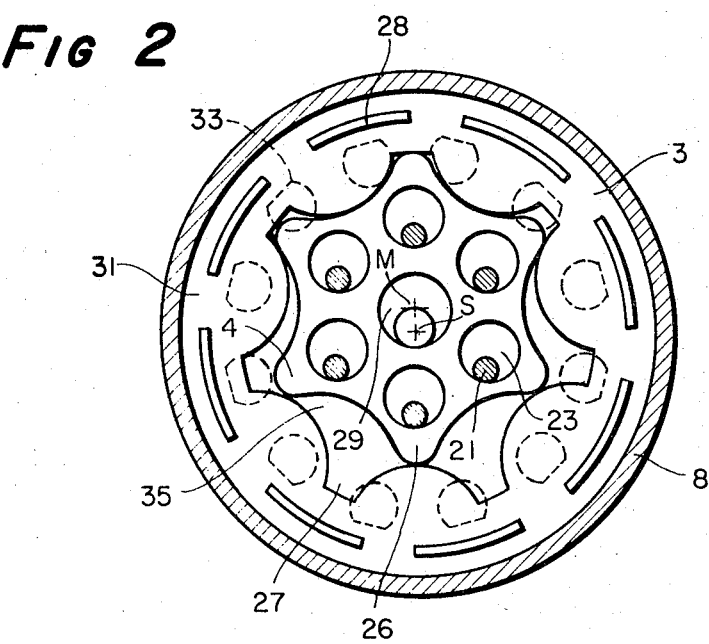
Figure 3:
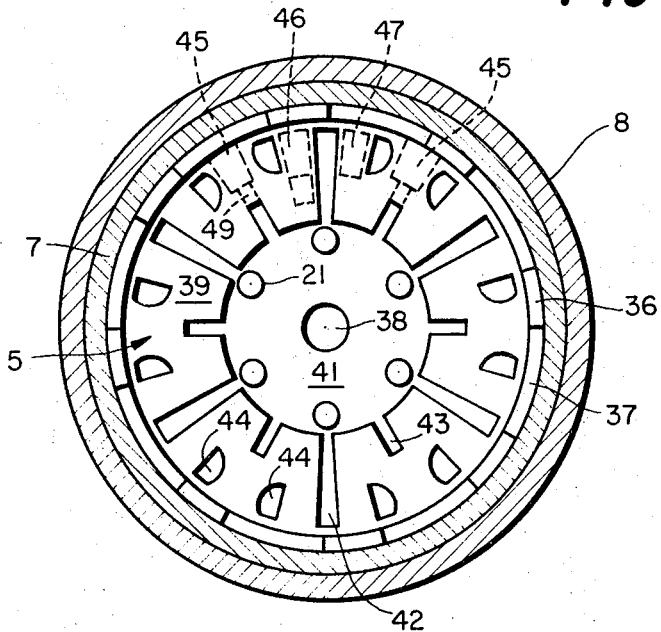
Figure 4:
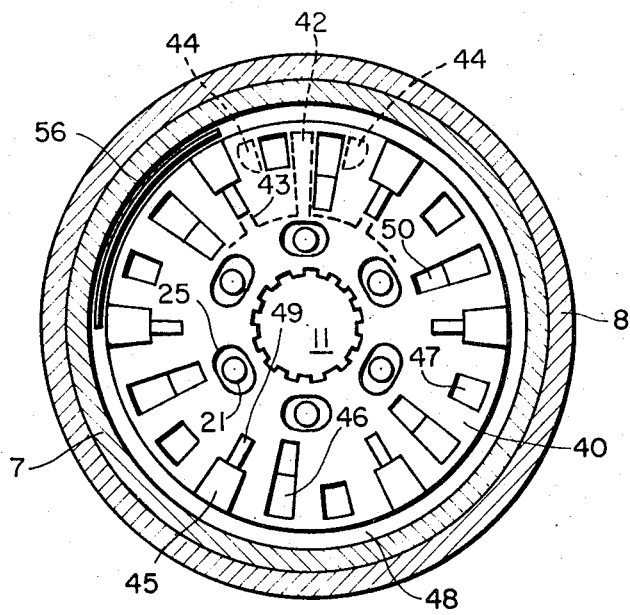

The invention will now be described in more detail by reference to an embodiment illustrated in the drawing, wherein:

FIG. 1 is a longitudinal section through hydrostatic control equipment of the invention, on the line I—I of FIG. 3, FIG. 2 is a cross-section on the line II—II of FIG. 1, FIG. 3 is a cross-section on the line III—III of FIG. 1, and FIG. 4 is a cross-section on the line IV—IV of FIG. 1.

In the control equipment illustrated, a toothed ring 3 and a toothed wheel 4 of a metering pump, a first disc 5 and a second disc 6 are arranged between a housing cover 1 and a housing part 2. A distance ring 7 is welded on to the housing part 2. The toothed ring 3 is welded on to the housing cover 1. The components are held together by means of a sleeve 8 which, with the help of a retaining ring 9, engages in a groove in the housing cover 1 and at its other end it has flanged rim 10 extending over a shoulder on the housing part 2.

Mounted in the housing part 2 is an actuating shaft 11, which is secured against axial displacement by a collar 12 and is solidly connected to the second disc 6, so as to rotate therewith, by means of a splined connection 13. Contained in the housing cover 1 are two ports 14 and 15 for the pipes supplying the control equipment, the supply pipe from the pump being connected to the port 14 and the supply pipe to the tank for the hydraulic fluid being connected to the port 15. Between the two ports is a passage 16 which contains a check valve 17, the stroke of which is limited by a stop 18. The housing part 2 contains two ports 19 and 20 to which may be connected the supply pipes to the equipment to be operated.

The first disc 5 carries six pins 21, one end 22 of each of which extends into circular holes 23 in the toothed wheel 4, whilst their other ends 24 engage in arcuate holes 25 in the second disc 6.

The toothed wheel 4 of the metering pump has six teeth 26, which successively enter seven gaps 27 between the teeth of the toothed wheel (FIG. 2). As this happens, the centre-point M of the toothed wheel 4 moves around the centre-point S of the toothed ring 3. Each complete circular path of the centre-point M corresponds to the rotation of the toothed wheel 4 through one pitch. The circular holes 23 have a diameter that is equal to the diameter of the above-mentioned circular path of the centre-point, plus the diameter of the pin 21. Consequently, the toothed wheel entrains the first disc 5 in its rotatory movement, without this driving action being interfered with by the movement of the centre-point over its circular path. Extending through the toothed ring is an annular passage, which consists of cut-away portions 28 and which cooperates with an annular groove 29 in the housing cover 1, supplied with fluid by the port 14. Extending through the toothed wheel is a central passage 29, which cooperates with the port 15 in the housing cover 1, through a central bore 30.

The commutator valve is formed on the end-face 31 of the toothed ring 3 and the end-face 32 of the first disc 5. The end-face 31 is illustrated in FIG. 2; the important details of the end-face 32, namely the mouths 33 of the orifices 34 in the first disc 5, are shown in broken lines. The mouths 33 are the same distance apart. Their number corresponds to twice the number of teeth 26 on the toothed wheel 4. They cooperate with the gaps between the teeth on the ring 3 to supply fluid to the cavities 35 between the toothed wheel and the toothed ring or to discharge it therefrom.

As will be further explained later, each second mouth 33 is connected to the supply line for the pressurized fluid and each mouth therebetween to the discharge line for the fluid. This means that in the form of construction of FIG. 2, the cavities 35 in the right-hand half, for example, are supplied with pressurized fluid and therefore try to increase in size, whilst fluid is discharged from the cavities 35 on the left-hand side, and these become smaller.

As FIG. 3 shows, the first disc 5 carries distance pieces 36 on the outside, so that an annular passage 37 is formed between the disc 5 and the ring 7, which passage forms an extension of the passage 28 in the toothed ring 3. In the middle, there is a central passage 38 which communicates with the central passage 29 in the toothed ring 4.

The change-over valve is formed between the end-face 39 of the first disc 5 and the end-face 40 of the second disc 6. The end-face 39 is illustrated in FIG. 3, the important parts of the end-face 40 being shown in dotted lines. The end-face 40 can be seen in FIG. 4, the important parts of the end-face 39 being shown in dotted lines.

A circular recess 41 is provided in the centre of the end-face 39, from which recess longer grooves 42 and shorter by-pass grooves 43 extend alternately radially outwards. The mouths 44 of the orifices 34 are non-uniformly spaced apart in such manner that the radial groove 42 can, in each case, extend across the greater space between two mouths 44.

In the end-face 40 are provided first recesses 45, second recesses 46, and third recesses 47. At the outside, the first recesses 45 communicate with an annular cavity 48, which constitutes an extension of the annular passage 37. They have inwardly extending by-pass grooves 49 which overlap the by-pass grooves 43 in the end-face 39 in the neutral position. The second recesses 46 communicate, via a radially outwardly offset orifice 50 in the second disc 6, with an annular cavity 51 on the inner end-face of the housing part 2, which communicates with the port 20 by way of passage 52. The third recesses 47 are extended, as orifices 53 through the disc 6, and communicate with an annular cavity 54 on the inner end-face of the housing part 2, which communicates with the port 19 by way of a passage 55.

The discs 5 and 6 are rotatable relatively to each other, the rotatory movement being limited by the length of the arcuate holes 25 into which the pins 21 extend. In the annular cavity 48, a return spring 56 is fitted around the second disc 6, which spring forces the two discs back into their neutral positions. Through torque applied to the actuating shaft 11, the two discs can be displaced from the illustrated neutral position, against the force of the spring 56, into one of two operative positions on either side thereof to cause the equipment to be operated to turn in the two directions, i.e., in the case of a steering system, in the two steering directions. In both operative positions, the by-pass through the by-pass grooves 43 and 49 is interrupted. In the first operative position, the first recesses 45 are caused to communicate with the mouths 44 of the orifices 34 positioned on one side of the recesses, the second recesses 46 are caused to communicate with the other mouths 44, and the third recesses 47, with the radial grooves 42. In the second operative position, the first recesses 45 are caused to communicate with the mouths 44 on their other side, the second recesses 46, with the radial grooves 42, and the third recesses 47 with the remaining mouths 44.

Consequently, the mode of operation is as follows:

In the neutral position, pressurized fluid flows to the port 14 and, by way of the annular cavity 29, the passage portions 28, the annular passage 37, the first recesses 45, the by-pass grooves 49 and 43 and back through the central passages 38, 29 and 30, to the port 15. Neither the metering pump nor the equipment to be operated are thereby loaded.

Let it be assumed that, for the first operative position, a steering wheel on the actuating shaft 11 is turned to the left, i.e. that the parts shown in dotted lines in FIG. 3 are turned relatively to the parts shown in solid lines, in the clockwise direction. The pressurized fluid then flows, as previously, to the first recess 45, thence, however, by way of the mouths 44, to the metering pump, from this, through the other mouths 44, to the second recesses 46, then on, by way of the orifice 50, the annular passage 51 and the passage 52, to the port 20 for the equipment to be operated and, after flowing through the equipment to be operated, it flows back, via the port 19, the passage 55, the annular passage 54 and the orifice 53 to the third recesses 47, whence it travels to the port 55 by way of the radial grooves 42 and the central passages 38, 29 and 30.

In the second operative position, i.e. when the actuating shaft 11 is turned to the right relatively to the first disc 5, the pressurized fluid flows from the first recesses 45 to the other mouths 44, so that the metering pump rotates in the opposite direction. From the outlet mouths 44, the fluid travels through the third recesses 47 from the opposite side and into the equipment to be operated, and finally returns to the port 15 through the second orifices and the radial grooves 42.

In both cases, therefore, fluid passes through the metering pump before the equipment to be operated. The direction of rotation of the metering pump corresponds to that of the shaft 11 and the direction in which it is required to turn the equipment. The entire amount of working fluid must pass through the metering pump, so that precise proportionality exists between the control movement applied to the shaft 11 and the quantity of fluid passing through the metering pump, i.e. the movement of the equipment to be operated.

Numerous modifications can of course be made to the illustrated embodiment, without departing from the basic concept of the invention. More than two discs 5 and 6 can be used if, for example, it is required to separate the change-over and commutator valves by a greater distance, or if it is not required to involve the metering pump itself in forming the commutator valve.

I claim:

1. Hydrostatic control apparatus for a steering system or the like, comprising a casing, a pair of fluid inlet and outlet ports in said casing, a second pair of ports in said casing having fluid communication with the exterior of said casing, an internally toothed ring gear having a fixed axis, a cooperating externally toothed star gear having one fewer teeth than said ring gear disposed eccentrically an eccentric distance relative to the axis of said ring gear, said star gear having rotational movement about its own axis and orbital movement about the axis of said ring gear with the teeth of said gears intermeshing in sealing engagement to form expanding cells on one side of the line of eccentricity and contracting cells on the other side of said line during relative movement between said gears, first and second mutually abutting and relatively rotatable plate valves mounted in said casing for rotation about said ring gear axis, said second valve being in relatively rotatable and slidably abutting engagement with said gears, drive means for rotating said second valve in synchronism with said rotational movement of said star gear, a plurality of circumferentially arranged and spaced passages in said second valve comprising a first series having fluid communication with said cells on one side of said line of eccentricity and a second series arranged alternately relative to said first series and having fluid communication with said cells on the other side of said line of eccentricity, lost motion means between said valves to allow a limited range of rotation of said first valve relative to said second valve, said range including a neutral position between two change over positions, neutral passage means in said valves for short circuiting fluid from said inlet port to said outlet port when said first valve is in its neutral position, change over passage means in said valves for selectively (1) directing fluid from said inlet port to either of said series of passages (2) directing fluid from the other series of passages to one of said ports of said second pair of ports and (3) directing fluid from the other one of said ports of said pair of ports to said outlet port, said drive means including a plurality of circumferentially spaced holes in said star gear and a like number of longitudinally extending and circumferentially arranged pins attached to and extending from both sides of said second valve, said pins extending respectively into said star gear holes, the diameter of said star gear holes being equal to twice said eccentric distance plus the diameter of said pins, said first valve having a plurality of circumferentially spaced holes for neutral and change-over control, said pins in said second valve extending into said first valve holes, said neutral passage means including a central hole in said star gear, and said inlet and outlet ports being at the gear end of said casing and said pair of ports being at the opposite end of said casing.

References Cited

UNITED STATES PATENTS

| | | | |
|---|---|---|---|
| Re. 25,126 | 2/1962 | Charlson | 91—56 |
| 3,348,493 | 10/1967 | Easton | 60—52S |
| 3,383,931 | 5/1968 | Patterson, Jr. | 91—56X |
| 3,385,057 | 5/1968 | Pruvot et al. | 91—56X |
| 3,401,602 | 9/1968 | Birdwell | 91—56 |
| 3,443,378 | 5/1969 | Monroe et al. | 91—56X |
| 3,452,543 | 7/1969 | Goff et al. | 91—56X |

MARTIN P. SCHWADRON, Primary Examiner

I. C. COHEN, Assistant Examiner